(12) United States Patent
Ek

(10) Patent No.: US 8,516,979 B2
(45) Date of Patent: Aug. 27, 2013

(54) RETRACTABLE LEASH WITH AUTOMATIC BRAKING MECHANISM

(76) Inventor: Joseph Ek, Fort Wayne, IN (US)

( * ) Notice: Subject to any disclaimer, the term of this patent is extended or adjusted under 35 U.S.C. 154(b) by 200 days.

(21) Appl. No.: 12/891,615

(22) Filed: Sep. 27, 2010

(65) Prior Publication Data
US 2012/0073516 A1    Mar. 29, 2012

(51) Int. Cl.
*A01K 27/00* (2006.01)

(52) U.S. Cl.
USPC ......................................................... 119/796

(58) Field of Classification Search
USPC ............ 119/792, 795–798; 242/396.2, 396.4
See application file for complete search history.

(56) References Cited

U.S. PATENT DOCUMENTS

| | | | |
|---|---|---|---|
| 2,791,397 A * | 5/1957 | Coffman ........................ | 182/239 |
| 3,853,283 A | 12/1974 | Croce et al. | |
| 4,500,048 A | 2/1985 | Schaller | |
| 4,501,230 A | 2/1985 | Talo | |
| 5,351,906 A * | 10/1994 | Feathers ..................... | 242/396.6 |
| 5,483,926 A | 1/1996 | Bogdahn | |
| 5,522,564 A * | 6/1996 | Schmidt et al. .............. | 242/374 |
| 5,524,833 A * | 6/1996 | Modinger et al. ............ | 242/379 |
| 5,771,993 A * | 6/1998 | Anderson et al. ............ | 182/239 |
| 6,904,872 B2 * | 6/2005 | Muller ........................... | 119/796 |
| 7,040,257 B2 | 5/2006 | Waxman et al. | |
| 2005/0217610 A1 | 10/2005 | Thompson et al. | |
| 2006/0096807 A1* | 5/2006 | Lee .............................. | 182/234 |
| 2007/0022975 A1* | 2/2007 | Arnold ......................... | 119/796 |
| 2009/0321550 A1* | 12/2009 | Boyer et al. ................. | 242/396.4 |
| 2011/0220036 A1* | 9/2011 | Matthews ..................... | 119/796 |

* cited by examiner

*Primary Examiner* — Rob Swiatek
*Assistant Examiner* — Kathleen Iwasaki
(74) *Attorney, Agent, or Firm* — Cahn & Samuels, LLP

(57) ABSTRACT

One example embodiment includes a retractable leash for restraining an animal attached to the retractable leash. The retractable leash includes a housing and a spool in the housing. The retractable leash also includes a leash, where the leash is wound around the spool and at least a portion of the leash can extend from the housing. The retractable leash further includes a cam, where the cam is configured to be forced outward against the housing when the spool rotates at a high rate.

7 Claims, 2 Drawing Sheets

RETRACTABLE LEASH WITH AUTOMATIC BRAKING MECHANISM

CROSS-REFERENCE TO RELATED APPLICATIONS

Not applicable.

BACKGROUND OF THE INVENTION

A favorite hobby of many pet owners is going for walks with their pet. For example, many dog and cat owners will often take their pet for a walk every day or almost every day. Unfortunately, this can lead to undesirable encounters. For example, pets can attack other animals or people. In addition, pets can become distracted and run away or run into the street where they can be hit and killed. Because of these dangers, many states and cities now have ordinances requiring pets to be on a leash when outdoors.

A particularly popular type of leash among pet owners is a retractable leash. A retractable leash can allow the pet owner to vary the distance that the pet can be from the owner at any given time. In particular, the owner can allow the pet to wander farther away when it is safe to do so and keep the pet closer when it would be unsafe for the pet to wander.

Retractable leashes often let out leash unless a brake is applied. That is, the default is that as the pet walks farther away, the retractable leash lengthens to accommodate the pet unless it is set to not let out any more leash. This can increase the danger for the pet and the pet owner. For example, if the owner sees danger, such as a car or another pet, the pet can continue to walk.

In addition, there is a danger if the pet begins to run away. By the time the pet owner has a chance to apply a brake, the pet may already have momentum away from the pet owner. That is, by the time the pet owner reacts to the pet running away, the pet may already be at a high rate of speed. If the pet owner then applies a brake or the leash reaches the full length all of the momentum acts as a force on the pet owner, pulling him or her in the direction of the running pet.

This can lead to discomfort or injury for the pet owner. For example, it can pull on the pet owner's arm or can pull the pet owner off his or her feet. The pet owner then has to try to prevent injury while simultaneously trying to regain control of the pet. In particular, the pet owner might continue to have a pet pulling them in one direction while simultaneously attempting to break his or her fall.

This can also lead to discomfort or injury to the pet. In particular, many leashes are attached to a pet via a collar. A collar is a piece of material placed around the pet's neck. This means that as the pet reaches the end of the leash or the owner applies the leash brake, the force applied by the owner to stop the pet's momentum is applied to the pet's neck which can cause injury to the pet's windpipe or vertebrae.

Accordingly, there is a need in the art for a leash that includes an automatic brake. Additionally, there is a need for the automatic brake to be applied quickly, before the pet has a chance to build up momentum.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a retractable leash for restraining an animal attached to the retractable leash. The retractable leash includes a housing and a spool in the housing. The retractable leash also includes a leash, where the leash is wound around the spool and at least a portion of the leash can extend from the housing. The retractable leash further includes a cam, where the cam is configured to be forced outward against the housing when the spool rotates at a high rate.

Another example embodiment includes a retractable leash for restraining an animal attached to the retractable leash. The retractable leash includes a housing and a spool in the housing. The retractable leash also includes a leash, where the leash is wound around the spool and at least a portion of the leash can be extracted from the housing. The retractable leash further includes an automatic braking means, where the automatic braking means is configured to lock the leash and prevent further extraction of the leash from the housing if the leash is extracted at high speed.

Another example embodiment includes a retractable leash for restraining an animal attached to the retractable leash. The retractable leash includes a housing, where the housing is configured to substantially cover the other parts of the retractable leash. The retractable leash also includes a spool. The spool includes an outer surface, where the outer surface is circular, and a central portion, where the central portion is configured to allow the spool to rotate. The retractable leash further includes a recoil spring, where the recoil spring is configured to move the spool back to its original position when the spool has moved, and a leash, where the leash is wound around the spool and at least a portion of the leash can extend from the housing. The retractable leash further includes a cam, where the cam is configured to be forced outward against the housing when the spool rotates quickly, and a retaining spring, where the retaining spring is configured to pull the cam toward the central portion of the spool when the spool is at rest. The retractable leash also includes a catch, where the catch is configured to prevent the cam from moving, where the cam stops the spool from rotating. The catch includes a stop, where the stop is configured to prevent forward motion of the cam along the path of the spool, and a backstop, wherein the backstop prevents the cam from rotating and exiting the catch.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
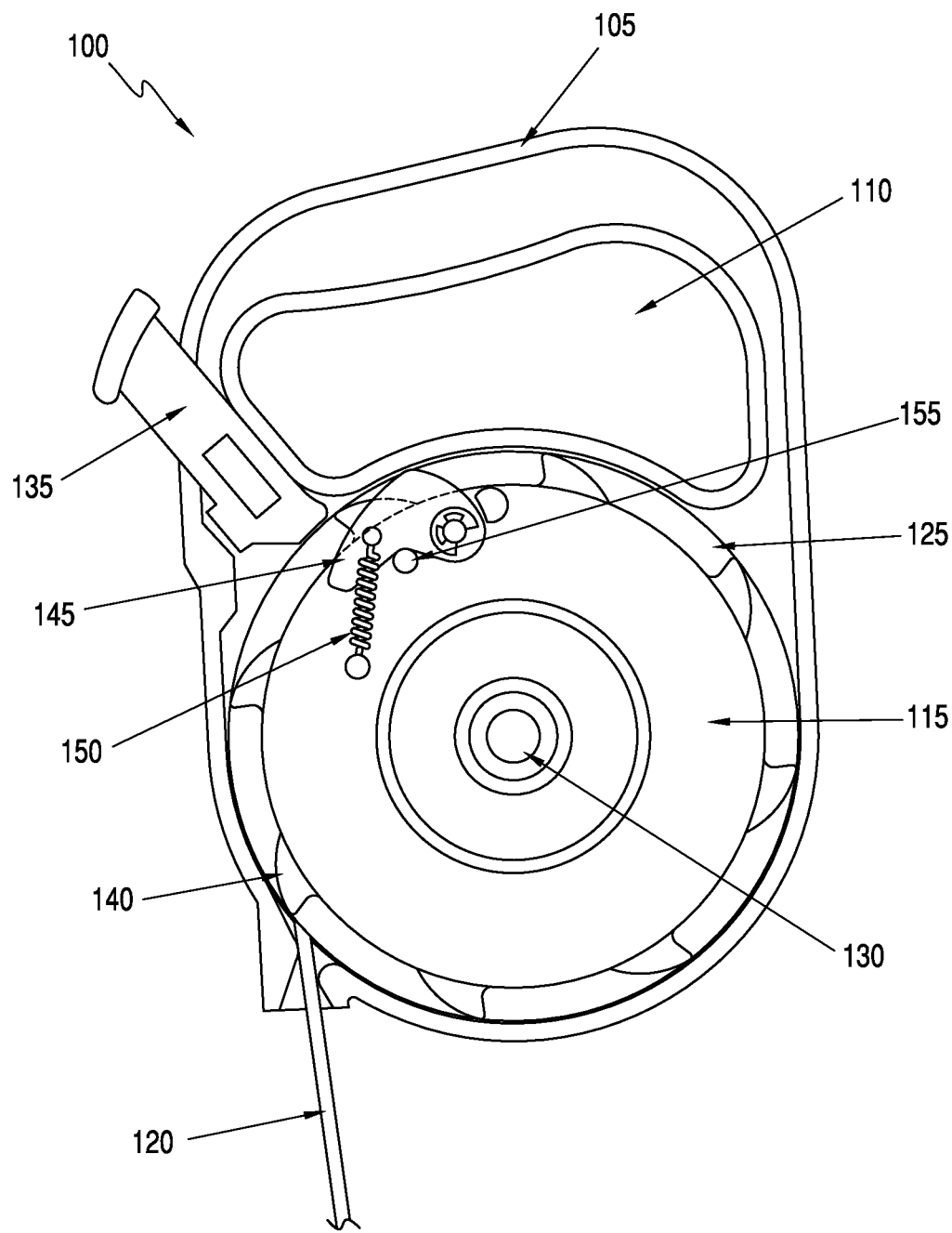
FIG. 1 illustrates an example of a retractable leash.

FIG. 1 illustrates an example of a retractable leash 100. In at least one implementation, a leash (also called a lead or lead line) is a rope or similar material attached to the neck, head or body of an animal for restraint or control. On the animal, some leashes clip or tie to a collar, harness, or halter, while others go directly around the animal's neck. In at least one implementation, the length of the retractable leash 100 can be adjusted by a user as necessary to keep the animal as close as desired by the user.

FIG. 1 shows that the retractable leash 100 can include a housing 105. In at least one implementation, the housing can substantially enclose the other parts of the retractable leash 100. As used in the specification and the claims, substantially enclose shall mean that the housing 105 surrounds the other parts of the retractable leash 100 except for those parts that need to be exposed to allow the retractable leash 100 to operate it a normal manner, unless otherwise specified. That is, the housing 105 can be configured to keep the various parts of the retractable leash 100 together. I.e., the housing 105 can be configured to ensure that the other parts of the retractable leash 100 remain in the desired position to allow the parts to perform their desired functions. Additionally or alternatively, the housing 105 can be used to protect the parts from damage.

FIG. 1 also shows that the retractable leash 100 can include a handle 110. In at least one implementation, the handle 110 can allow a user to hold the retractable leash 100. That is, the handle 110 can allow a user to use the retractable leash 100 to control an animal.

FIG. 1 further shows that the retractable leash 100 can include a spool 115. In at least one implementation, the spool 115 includes a cylinder or spindle. In particular, the spool 115 can be circular in shape in order to allow easy winding and unwinding. That is, the spool 115 can be rotated, which will wind or unwind the spool, as discussed below.

FIG. 1 also shows that the retractable leash 100 can include a leash 120. The leash 120 can include any material which allows the retractable leash 100 to control an animal as desired by the user. In particular, the leash 120 can be made of any material which can withstand the force of the user and the animal pulling against one another. For example, the leash 120 can be made of metal, leather, braided leather, nylon cord, nylon webbing or any other suitable material.

FIG. 1 shows that the leash 120 can extend from the housing 105. In at least implementation, the leash 120 can be extracted to any length desired, up to a maximum length, that allows the user to maintain control of the animal. In particular, the end of the leash 120 can include a clip that can be connected to a collar or harness placed on the animal. The leash 120 can be of the maximum length at which a user would feel comfortable controlling the animal. For example, if the user wishes to allow the animal to be between 15 and 25 feet away, the leash 120 can be 25 feet long.

FIG. 1 shows that the leash 120 can be wound around the spool 115. In at least one implementation, the leash 120 wound around the spool 115 can allow the user to vary the length of the leash 120 which extends from the housing 105. That is, winding more of the leash 120 around spool 115 allows the leash 120 to extend a shorter distance from the housing 105. In contrast, winding less of the leash 120 around the spool 115 allows the leash 120 to extend a longer distance from the housing 105.

FIG. 1 shows that the spool 115 can include a flange 125. In at least one implementation, the flange 125 can prevent the leash 120 from slipping off the spool 115. That is, as the leash 120 is wound around the outer surface of the spool 115, the flange 125 can prevent the leash 120 from slipping off of the outer surface. Additionally or alternatively, the housing 105 can fit tightly around the spool 115 preventing any slippage of the leash 120 relative to the spool 115.

FIG. 1 shows that the spool 115 includes a central portion 130. In at least one implementation, the central portion 130 allows the spool 115 to rotate. In particular, the central portion 130 can hold the central point of the spool 115 in one location relative to the housing 105. That is, the central portion 130 holds the central point of the spool 115 immobile, except for rotational movement, within the housing 105.

In at least one implementation, the spool 115 also includes a recoil spring. In at least one implementation, the recoil spring is configured to move the spool 115 back to its original position when the spool 115 has moved. That is, the recoil spring retains rotation energy when the leash 120 extends from the housing 105. When the leash 120 is released, the spring releases the rotational energy, causing the spool 115 to rotate and the leash 120 to wind around the spool 115.

FIG. 1 further shows that the retractable leash 100 can include a manual brake 135. In at least one implementation, the manual brake 135 can be used to prevent the spool 115 from rotating. In particular, the manual brake 135 can be pushed by a user to contact the spool 115. As the manual brake 135 comes in contact with the spool 115, the spool 115 is prevented from rotating. For example, the spool 115 can include one or more tabs 140. When the manual brake 135 is engaged, rotation of the spool 115 causes the one or more tabs 140 to come in contact with the manual brake 135, which prevents rotation of the spool 115.

In at least one implementation, the manual brake 135 can include a thumb brake. That is, the manual brake 135 is configured to be near the user's thumb when the user is holding the handle 105 of the retractable leash 100. A thumb brake can allow the user to maintain his or her grip on the handle 105 while simultaneously engaging the manual brake 135. This is, the user can engage the manual brake 135 without loosening his or her grip on the handle 105.

In at least one implementation, the manual brake 135 can include a lock. In particular, the lock can be configured to keep the manual brake engaged until disengaged by a user. That is, the lock can allow the user to prevent rotation of the spool 115 without needing to continue to push on the manual brake 135.

FIG. 1 also shows that the retractable leash 100 can include a cam 145. In at least one implementation, the cam 145 can include a disk or cylinder having an irregular form. That is, cam 145 can be shaped such that the diameter varies in different directions. A varying diameter can allow rotation of the cam 145 to bring the cam 145 into contact with, or avoid contact with, other objects depending on the orientation of the cam 145. For example, the cam 145 can be substantially L shaped. That is, the cam 145 can include a first portion and a second portion that is perpendicular, or approximately perpendicular, to the first portion.

FIG. 1 further shows that the cam 145 is attached to the spool 115. In at least one implementation, attaching the cam 145 to the spool 115 can allow the cam 145 to automatically stop the spool 115 from rotating faster than a certain rotational speed. That is, if the leash 120 is extracted from the housing 105 at a high rate of speed, the spool 115 will rotate quickly enough that the cam 145 will prevent further motion of the spool 115, as discussed below.

FIG. 1 further shows that the retractable leash 100 can include a retaining spring 150 including a first end attached to the cam 145 and a second end attached to the spool 115. In at least one implementation, the retaining spring 150 is configured to pull the cam 145 toward the central portion 130 of the spool 115. That is, the retaining spring 150 can be used to ensure that the cam 145 does not come into contact with the housing 105 when the spool 115 is stationary or at low rotational speeds.

FIG. 1 also shows that the retractable leash 100 can include a stop 155. In at least one implementation, the stop 155 prevents the cam 145 from moving too far toward the central portion 130 of the spool 115. In particular, the stop 155 can prevent the retaining spring 150 from fully relaxing which keeps the cam 145 firmly against the stop 155.

Figure 2:
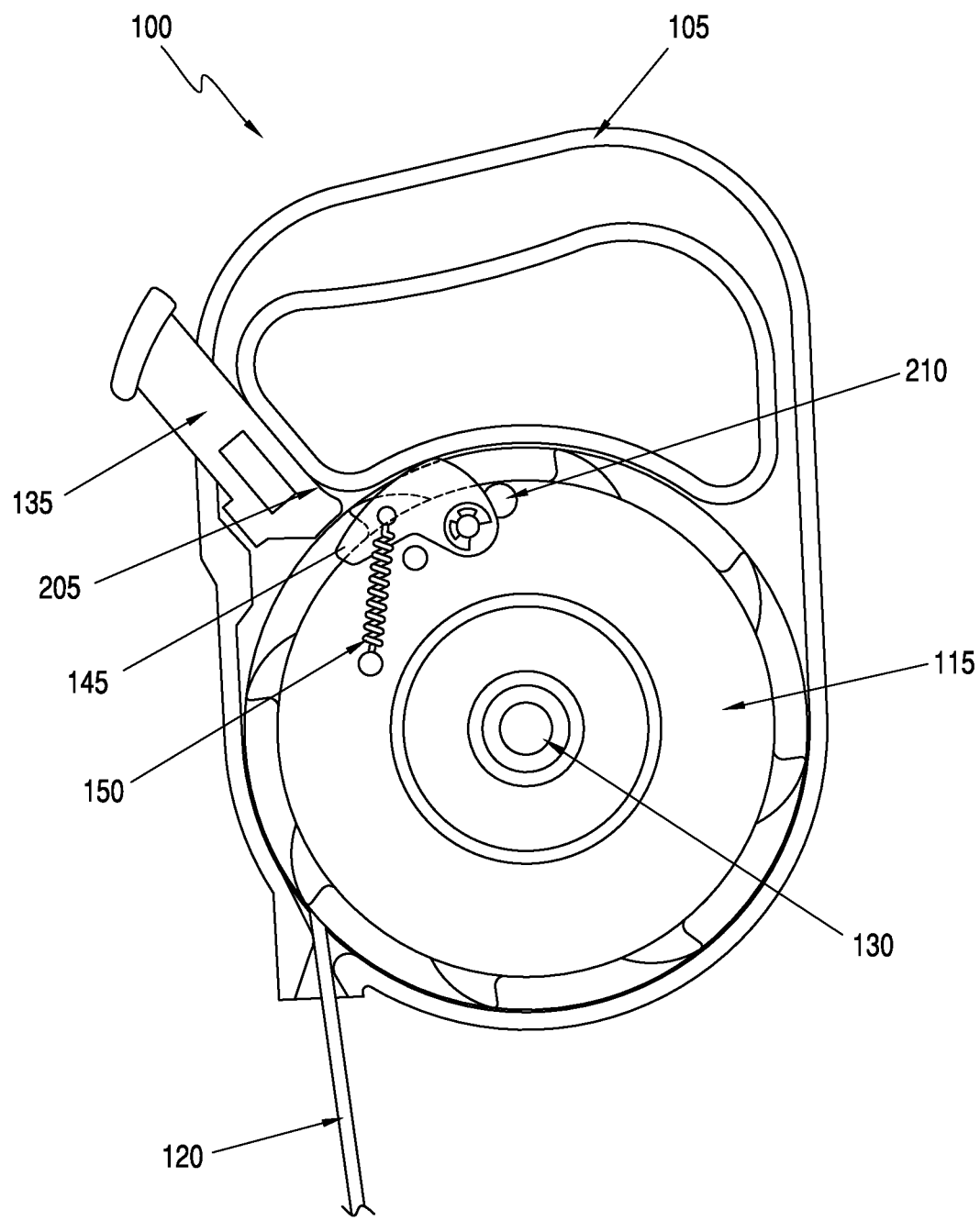
FIG. 2 illustrates an example of a retractable leash in which an automatic brake has been applied.

FIG. 2 illustrates an example of a retractable leash 100 in which an automatic brake has been applied. In at least one implementation, an automatic brake can stop the leash 120 from being extracted from the housing 105 if the leash 120 begins to be extracted too quickly. For example, if the leash 120 is connected to an animal that begins to run away, the automatic brake can stop the leash 120 from being extracted from the housing 105. Additionally or alternatively, the automatic brake can stop the leash 120 from being extracted from the housing 105 if the user stops and the animal continues to walk.

FIG. 2 shows that the retractable leash 100 includes a catch 205. In at least one implementation, the catch 205 is configured to catch the cam 145. That is, if the centrifugal force from the spinning of the spool 115 is sufficient, the cam 145 will be pushed away from the center portion 130 and pull on the retaining spring 150. When the centrifugal force is sufficient, the cam will try to push beyond the outer circumference of the spool 115. For most of the outer circumference, the housing will prevent the cam 145 from pushing out too far. However, when the cam 145 reaches the catch 205 the cam 145 will abut the catch 205. The cam 145 is then stopped by the catch 205, which in turn can stop the spool 115 which is attached to the cam 145.

In at least one implementation, the catch 205 can include a portion of the housing 105. That is, the catch 205 can include a portion of the housing 105 where the housing 105 is further from the spool 115 than other portions of the housing 105. Additionally or alternatively, the catch 205 can include a portion of the manual brake 135 or any other mechanism that is configured to catch the cam 145 and prevent it from moving.

In at least one implementation, the rotational speed of the spool 115 necessary for the cam 145 to act against the retaining spring 150 and therefore move towards the outer circumference of the spool 115 is determined by the placement of the cam 145 relative to the outer edge of the spool 115, the type and placement of the retaining spring 150 and the mass of the cam 145. For example, the cam 145 can be configured to enter the catch 205 when the leash is being extracted at between 1 foot per second (fps) and 2 fps. In particular, the cam 145 can be configured to enter the catch 205 at approximately 1.5 fps. As used in the specification and the claims, the term approximately shall mean that the value is within 10% of the stated value, unless otherwise specified.

In at least one implementation, the catch 205 can include a switch which allows the user to prevent the cam 145 from entering the catch 205 if desired. For example, the switch can prevent the cam 145 from rotating relative to the spool 115. Additionally or alternatively, the switch can prevent the cam 145 from entering the catch 205. For example, the switch can include a section of housing 105 which is movable and can be used to prevent the cam 145 from entering the catch 205.

FIG. 2 also shows that the retractable leash 100 can include a backstop 210. In at least one implementation, the backstop 210 can prevent further rotation of the cam 145. That is, the cam 145 will enter the catch 205 and the force of the cam 145 striking the catch 205 will tend to rotate the cam 145. The backstop 210 can prevent the cam 145 from rotating too far and exiting the catch 205 without stopping the spool 115.

In at least one implementation, the backstop 210 can also help stop the spool 115 from rotating. In particular, the backstop 210 can provide a force point where the spool 115 strikes the cam 145 if the cam 145 has entered the catch 205. This can help ensure that the forces involved in stopping the spool 115 do not break the spool 115 or the cam 145.

In at least one implementation, the retractable leash 100 can include a cam 145 on either side of the spool 115. In particular, a second cam 145 can be opposite the cam 145. The cam 145 and a second cam can work with one another to stop the spool 115 from rotating. For example, the cam 145 and a second cam can be connected to one another through an axle which extends through the spool 115. As the spool 115 rotates rapidly the centrifugal force on the cam 145 and the second cam can be equalized such that both or neither enter the catch 205 depending on the speed of rotation. A second cam and a second backstop can further reduce the force on the spool 115 as the cam 145 is stopped by the catch 205.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A retractable leash for restraining an animal attached to the retractable leash, the retractable leash comprising;
   a housing including an inner wall;
   a spool rotationally mounted in said housing, wherein the inner wall extends around the outer circumference of said spool and is stationary relative to said spool;
   a leash wound around the spool, at least a portion of the leash extending from the housing, said leash causing said spool to rotate when said leash is extracted from said housing;
   a cam that is pivotally attached to said spool that contacts the inner wall of said housing when said spool rotates above a threshold speed;
   a retaining spring that prevents said cam from contacting the inner wall of said housing until said spool reaches the threshold speed; and
   a manual brake, wherein the manual brake is configured to prevent rotation of the spool when engaged by a user.

2. The retractable leash of claim 1, wherein the manual brake includes a catch, wherein the catch is configured to catch the cam, preventing movement of the cam and the spool.

3. The retractable leash of claim 1, wherein the housing includes a catch, wherein the catch is configured to catch the cam, preventing movement of the cam.

4. The retractable leash of claim 3 further comprising a backstop, wherein the backstop is configured to prevent the cam from rotating beyond a pre-determined point when engaged in the catch.

5. The retractable leash of claim 1, wherein the cam is substantially L shaped.

6. The retractable leash of claim 1, wherein the cam is configured to be forced outward when the leash is extracted between 1 and 2 feet per second.

7. The retractable leash of claim 6, wherein the cam is configured to be forced outward when the leash is extracted at approximately 1.5 feet per second.

* * * * *